(12) United States Patent
Reiter

(10) Patent No.: US 6,921,036 B2
(45) Date of Patent: Jul. 26, 2005

(54) FUEL INJECTION VALVE

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 10/110,095

(22) PCT Filed: Jul. 20, 2001

(86) PCT No.: PCT/DE01/02766

§ 371 (c)(1),
(2), (4) Date: Sep. 18, 2002

(87) PCT Pub. No.: WO02/12710

PCT Pub. Date: Feb. 14, 2002

(65) Prior Publication Data

US 2003/0079714 A1 May 1, 2003

(30) Foreign Application Priority Data

Aug. 5, 2000 (DE) .......................................... 100 38 293

(51) Int. Cl.$^7$ .......................... B05B 1/30; F02M 59/00; F02M 39/00
(52) U.S. Cl. ............................ 239/585.5; 239/585.1; 239/533.2; 239/533.3; 239/88; 239/533.9
(58) Field of Search .......................... 239/585.1–585.5, 239/533.2, 533.3, 533.9, 88–93, 900; 251/129.15, 129.21, 127

(56) References Cited

U.S. PATENT DOCUMENTS

| | | | | |
|---|---|---|---|---|
| 5,114,077 A | * | 5/1992 | Cerny ........................ 239/483 |
| 5,236,173 A | * | 8/1993 | Wakeman ............... 251/129.16 |
| 5,315,278 A | * | 5/1994 | Demere et al. .............. 335/282 |
| 5,613,640 A | | 3/1997 | Furuya et al. |
| 5,645,226 A | * | 7/1997 | Bright ..................... 239/585.1 |
| 6,145,761 A | * | 11/2000 | Muller et al. .......... 239/533.12 |
| 6,494,388 B1 | * | 12/2002 | Mueller et al. ........ 239/533.12 |

FOREIGN PATENT DOCUMENTS

| | | |
|---|---|---|
| DE | 198 28 849 | 12/1999 |
| DE | 198 49 210 | 4/2000 |
| JP | 60 164 659 | 8/1985 |
| JP | 60 192 873 | 10/1985 |
| JP | 60 192 874 | 10/1985 |

OTHER PUBLICATIONS

Beitz et al., *DUBBLE Pocketbook For Mechanical Engineering*, 1997 Stringer, Berlin, ISBN No. 3–540–6247–8, 19$^{th}$ Ed., Cone Interference Connections, p. G27, par. 1.4, p. G30, par. 1.4.3, figure 33G.*.

* cited by examiner

Primary Examiner—Davis Hwu
(74) Attorney, Agent, or Firm—Kenyon & Kenyon

(57) ABSTRACT

A fuel injector, in particular for direct injection of fuel into the combustion chamber of an internal combustion engine having mixture compression and spark ignition, has an armature, which cooperates with a solenoid, and a valve needle, which is connected to the armature, and on which a valve-closure member is provided which, together with a valve-seat surface, forms a sealing seat. The valve needle has a conical area, which cooperates with a conical recess in the armature so that the armature, is joined to the valve needle in a friction-locking and form-locking manner.

11 Claims, 2 Drawing Sheets

FUEL INJECTION VALVE

FIELD OF THE INVENTION

The present invention relates to a fuel injector.

BACKGROUND INFORMATION

Fuel injectors, which are preferably suitable for direct injection of fuel into the combustion chamber of an internal combustion engine, are usually equipped with valve needles which are either riveted to an armature, which is actuated by the valve needle, or they are connected to the armature in a friction-locking or form-locking manner by two sleeves welded to the valve needle.

One disadvantage of the method of riveting the armature onto the valve needle is in particular that high forces are needed to reliably join the valve needle and the armature. This may easily result in deformation of or cracks in the material of the armature or the valve needle, which may later result in malfunctions in operation of the fuel injector.

If the armature and the valve needle are joined by flanges welded to the valve needle, the manufacturing and installation complexity due to the large number of components which are assembled is a particular disadvantage.

SUMMARY OF THE INVENTION

The fuel injector according to the present invention has the advantage over the related art that no welding or riveting of the two components is necessary due to a conical design of the part of the valve needle which passes through the armature and a corresponding shaping of the recess which accommodates the valve needle.

It is advantageous in particular that when the fuel injector is closed or is being closed, the conical connection is reinforced by the force of the restoring spring.

The special shape of the conical area of the valve needle as well as the matching shape of the recess in the armature ensures to advantage that, also when opening the valve, the conical connection is stressed only by the needle's own weight and by low hydraulic forces of the fuel flowing around the armature.

It is advantageous in particular that the manufacture of the assembly composed of the valve needle and the armature may be accomplished rapidly and inexpensively, because the two parts are easy to manufacture and no other components which would have to be joined to the valve needle by welding or other complicated joining procedures are needed.

It is also advantageous that the inlet end of the valve needle which projects beyond the armature surface may provide centering for the restoring spring, which is supported on the inlet side of the armature surface.

DETAILED DESCRIPTION

Figure 1:
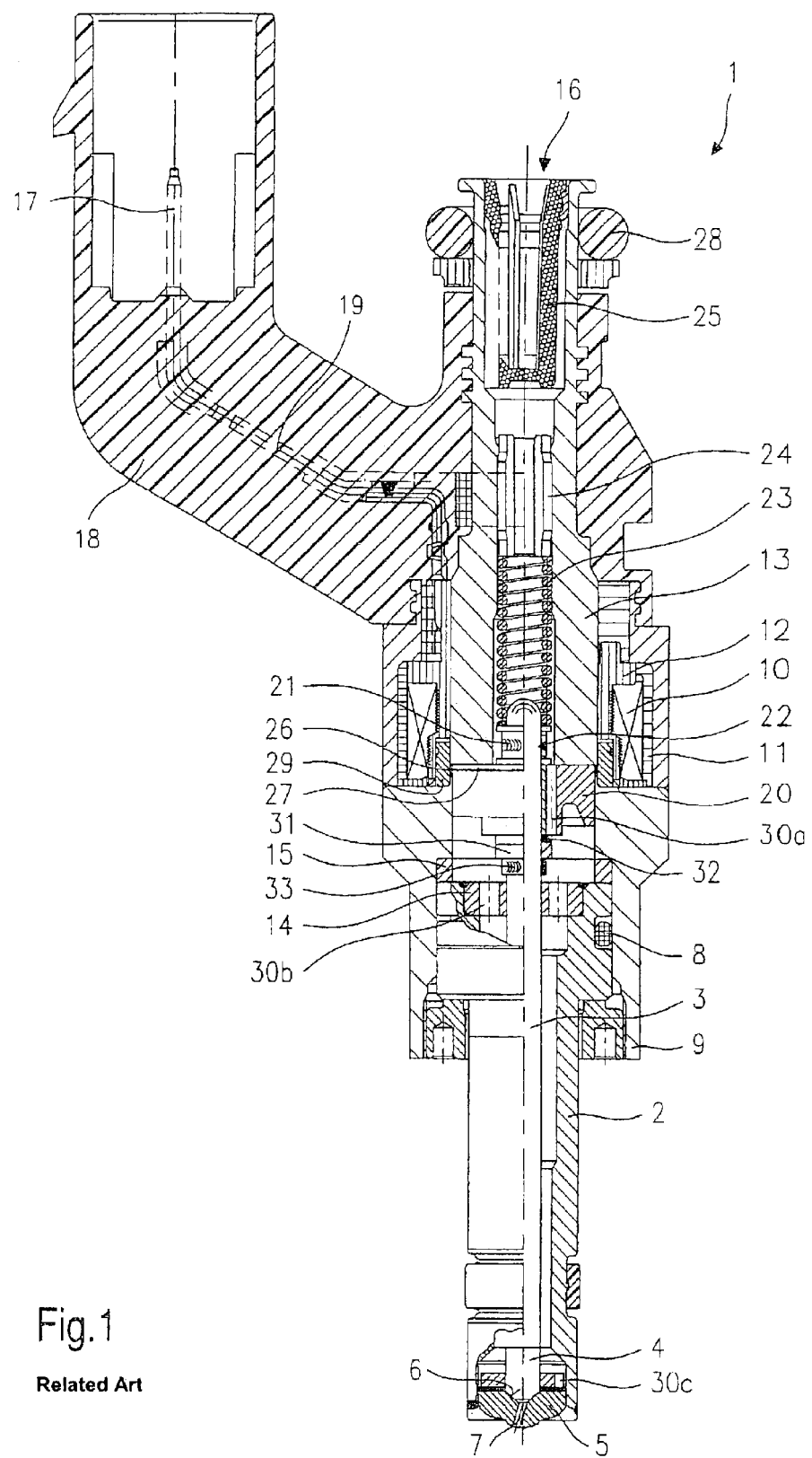
FIG. 1 shows a schematic sectional view through a fuel injector according to the related art.

Before describing two embodiments of a valve needle 3 and an armature 20 of a fuel injector according to the present invention on the basis of FIGS. 2A and 2B, a fuel injector 1 according to the related art will be explained first briefly with regard to its components on the basis of FIG. 1.

Fuel injector 1 is designed in the form of a fuel injector for fuel injection systems of engines having fuel mixture compression and spark ignition. Fuel injector 1 is suitable in particular for direct injection of fuel into a combustion chamber of an engine.

Fuel injector 1 has a nozzle body 2 in which a valve needle 3 is situated. Valve needle 3 is mechanically linked to a valve-closure member 4 which cooperates with a valve-seat surface 6 provided on a valve seat body 5 to form a sealing seat. Fuel injector 1 is an inwardly opening fuel injector 1 in this embodiment and has an injection orifice 7. Nozzle body 2 is sealed by a gasket 8 against stationary pole 9 of a solenoid 10. Solenoid 10 is encapsulated in a coil housing 11 and is wound on a field spool 12 which is in contact with an internal pole 13 of solenoid 10. Internal pole 13 and stationary pole 9 are separated by a gap 26 and are supported on a connecting component 29. Solenoid 10 is energized via a line 19 by an electric current via an electric plug-in contact 17. Plug-in contact 17 is encased in a plastic sheathing 18, which may be integrally molded on internal pole 13.

Valve needle 3 is guided in a valve needle guide 14 which is designed as a disk. A matching adjusting disk 15 is used to adjust the lift. An armature 20 is situated on the other side of adjusting disk 15. Via a first flange 21, the armature is in a friction-locking connection with valve needle 3, which is joined by a weld 22 to first flange 21. A restoring spring 23, which is pre-stressed by a sleeve 24 in the present design of fuel injector 1, is supported on first flange 21.

A second flange 31, which is also joined to valve needle 3 by a weld 33, functions as the lower armature stop. An elastic intermediate ring 32 which sits on second flange 31 prevents rebound when fuel injector 1 closes.

Fuel channels 30a through 30c convey fuel which is supplied through a central fuel feed 16 and is filtered through a filter element 25, to injection orifice 7, these channels running in valve needle guide 14, in armature 20 and on valve seat body 5. Fuel injector 1 is sealed from a cylinder head (not shown) and a distributor line by a gasket 28.

In the resting state of fuel injector 1, armature 20 is acted upon by restoring spring 23 against its direction of lift via first flange 21 on valve needle 3, so that valve-closure member 4 is held in sealing contact on valve seat 6. When solenoid 10 is energized, it builds up a magnetic field which moves armature 20 in the direction of lift against the spring force of restoring spring 23, the lift being predetermined by a working gap 27 between internal pole 12 and armature 20 in the resting position. Armature 20 also entrains flange 21, which is welded to valve needle 3, and thus also valve needle 3 in the direction of lift. Valve-closure member 4, which is mechanically linked with valve needle 3, is lifted up from valve-seat surface 6, and fuel carried through to injection orifice 7 via fuel channels 30a through 30c is injected.

When the coil current is turned off, armature 20 drops back from internal pole 13 due to the pressure of restoring spring 23 onto first flange 21 after the magnetic field has been reduced sufficiently, so that valve needle 3 moves against the direction of lift. Therefore, valve-closure member 4 comes to rest on valve-seat surface 6 and fuel injector 1 is closed.

In a detail of a sectional view, FIG. 2 shows a first embodiment of valve needle 3 of a fuel injector 1, according to the present invention, which is connected to armature 20.

In contrast with the embodiment of a fuel injector 1 illustrated in FIG. 1, where valve needle 3 is mechanically linked to armature 20 via flange 21, which is welded to valve needle 3, valve needle 3 of fuel injector 1 according to the present invention is designed so that a friction-locking connection between armature 20 and valve needle 3 is achieved without welding.

Figures 2A, 2B:
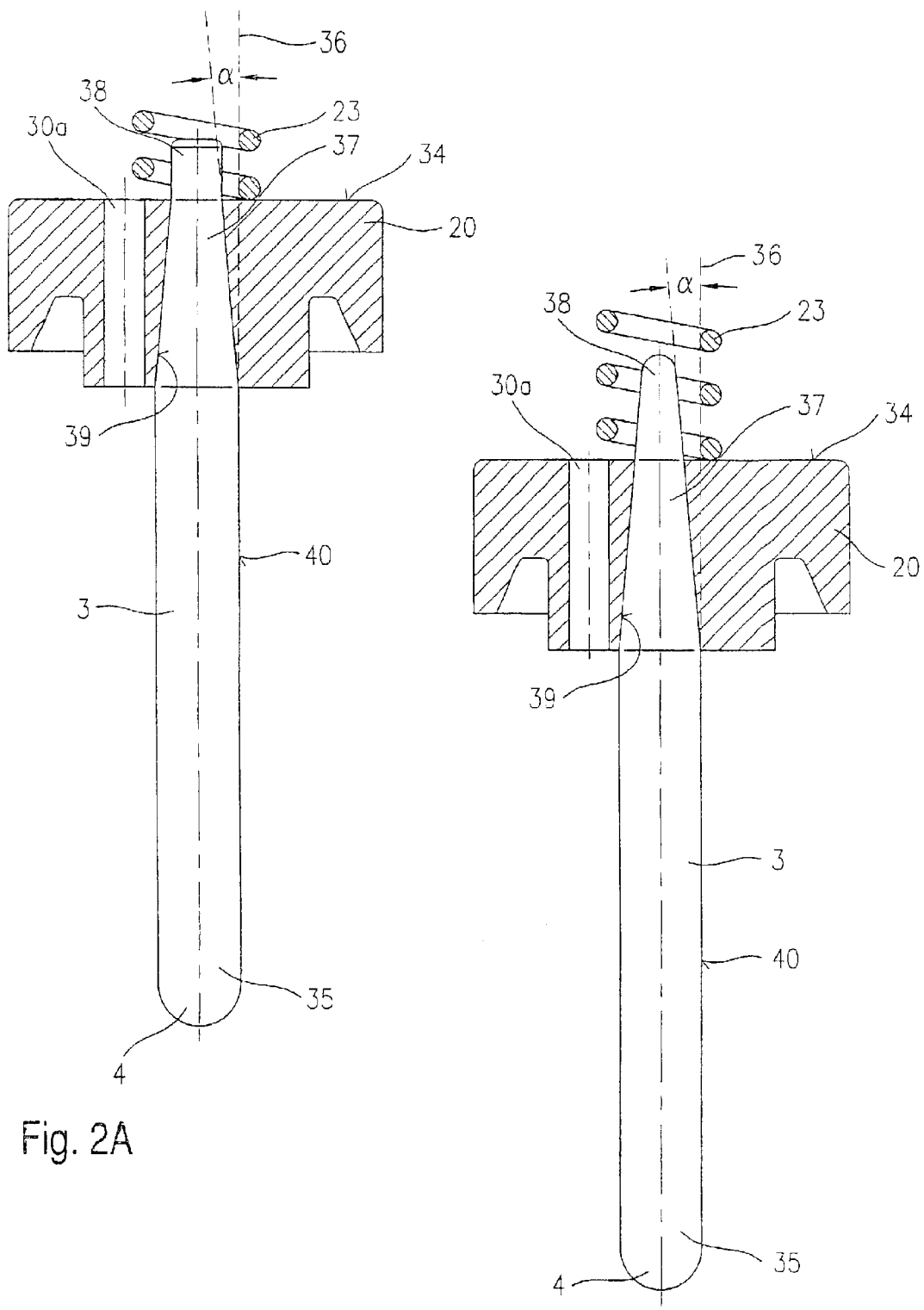
FIG. 2A shows a schematic partial sectional view through a first embodiment of a valve needle having the armature of a fuel injector according to the present invention secured on it.
FIG. 2B shows a schematic partial sectional view through a second embodiment of a valve needle having the armature of a fuel injector according to the present invention secured on it.

As shown in FIG. 2A, valve needle 3 has a conical shape in an area 37 passing through armature 20. This shape may be achieved by turning or casting valve needle 3. A central recess 39 in armature 20 also has a conical shape, cone angle α of conical recess 39 of armature 20 and of conical area 37 of valve needle 3 being the same with respect to a straight line 36 running parallel to the longitudinal axis of the valve. Straight line 36 may coincide in particular with lateral surface 40 of valve needle 3 outside of conical area 37.

Recess 39 of armature 20 may be designed so that only a portion of its axial extent is conical.

Valve needle 3 thus passes through central recess 39 of armature 20 and projects at an inlet end 38 beyond an inlet end face 34 of armature 20. Inlet end 38 of valve needle 3 is cylindrical in the present first embodiment, the diameter of inlet end 38 being somewhat smaller than the diameter of outlet end 35 of valve needle 3 according to the taper of valve needle 3 due to conical area 37.

Restoring spring 23 is supported directly on inlet end face 34 of armature 20, in contrast with the embodiment in FIG. 1, where restoring spring 23 is supported on flange 21 which is in turn welded to valve needle 3. Restoring spring 23 is held in a centered position by inlet end 38 of valve needle 3 projecting beyond inlet end face 34 of armature 20, and thus there is no radial slippage during operation of fuel injector 1.

Valve needle 3 and armature 20 are connected by a single joining operation. In doing so, conical recess 39 in armature 20 is positioned over valve needle 3 until conical area 37 of valve needle 3 is in conical recess 39 in armature 20. Then armature 20 is pressed onto valve needle 3 by a defined force.

When fuel injector 1 is opened, armature 20 is pulled in the direction of internal pole 13 (not shown). The conical connection between valve needle 3 and armature 20 is acted upon only by the weight of valve needle 3 and by minor hydraulic forces exerted by fuel flowing through fuel injector 1 on inlet end face 34 of armature 20. When fuel injector 1 closes, the conical connection is supported by the high force of restoring spring 23, which is supported on the inlet end face 34 of armature 20, because restoring spring 23 presses armature 20 onto valve needle 3 and thus presses valve needle 3 into the sealing seat.

In the same type of diagram as FIG. 2A, FIG. 2B shows a second embodiment of valve needle 3 having armature 20 secured on it.

In contrast with the first embodiment in FIG. 2A, inlet end 38 of valve needle 3 in the present embodiment is not cylindrical but instead is conical as a continuation of conical area 37. Cone angle α between conical area 37 and straight line 36 remains constant. This embodiment also has the advantage that the manufacture of valve needle 3 is further simplified because it is possible to machine conical area 37 and inlet end 38 of valve needle 3 in one operation.

Inlet end 38 of valve needle 3 again projects beyond inlet end face 34 of armature 20 and thus ensures the centering of restoring spring 23.

In the embodiments of valve needle 3 illustrated in FIGS. 2A and 2B, outlet end 35 of valve needle 3 may be provided with a valve-closure member 4 according to the design of a fuel injector 1 which opens either inwardly or outwardly in any desired manner. In particular, a one-piece design of valve needle 3 and valve-closure member 4 is recommended to further simplify the manufacturing.

The present invention is not limited to the embodiments illustrated here and is also applicable to other valve needles 3, e.g., double needles and hollow needles in combination with any armature designs, e.g., submersible armatures and flat-type armatures, as well as any fuel injector designs.

What is claimed is:

1. A fuel injector, comprising:
   a solenoid;
   a valve closure member;
   a valve seat surface;
   an armature cooperating with the solenoid; and
   a valve needle connected to the armature and on which the valve-closure member is provided, which together with the valve-seat surface forms a sealing seat, wherein:
   the valve needle includes a conical area, and
   the conical area of the valve needle cooperates with a conical recess in the armature so that the armature is joined to the valve needle in a friction-locking and form-locking manner.

2. The fuel injector according to claim 1, wherein the fuel injector is for a direct injection of a fuel into a combustion chamber of an internal combustion engine having a mixture compression and a spark ignition.

3. The fuel injector according to claim 1, wherein the valve needle passes through the armature at least in the conical area.

4. The fuel injector according to claim 1, wherein an inlet end of the valve needle projects beyond an inlet end face of the armature.

5. The fuel injector according to claim 4, wherein the inlet end of the valve needle is cylindrical.

6. The fuel injector according to claim 4, wherein the inlet end of the valve needle is conical.

7. The fuel injector according to claim 6, wherein a cone angle of the inlet end of the valve needle matches a cone angle of the conical area of the valve needle.

8. The fuel injector according to claim 4, further comprising:
   a restoring spring acting on the armature and being locked radially by the inlet end of valve needle.

9. The fuel injector according to claim 1, wherein the armature is connectable to the valve needle by pressing it onto the valve needle.

10. The fuel injector according to claim 1 wherein the conical recess in the armature
    includes a conical shape over an entire axial extension thereof.

11. The fuel injector according to claim 1, wherein the conical recess in the armature includes a conical shape over a portion of an axial extension thereof.

\* \* \* \* \*